| (12) | United States Patent | (10) Patent No.: | US 10,265,904 B2 |
|---|---|---|---|
| | Ohtaki et al. | (45) Date of Patent: | Apr. 23, 2019 |

(54) DEVICE FOR PRODUCING HOLLOW CONTAINER

(71) Applicant: YACHIYO INDUSTRY CO., LTD., Saitama (JP)

(72) Inventors: Kazuhiro Ohtaki, Saitama (JP); Satoru Araya, Saitama (JP)

(73) Assignee: Yachiyo Industry Co., Ltd., Saitama (JP)

( * ) Notice: Subject to any disclaimer, the term of this patent is extended or adjusted under 35 U.S.C. 154(b) by 101 days.

(21) Appl. No.: 15/533,026

(22) PCT Filed: Oct. 16, 2015

(86) PCT No.: PCT/JP2015/079264
§ 371 (c)(1),
(2) Date: Jun. 4, 2017

(87) PCT Pub. No.: WO2016/088457
PCT Pub. Date: Jun. 9, 2016

(65) Prior Publication Data
US 2018/0257290 A1    Sep. 13, 2018

(30) Foreign Application Priority Data

Dec. 5, 2014 (JP) ................................. 2014-246500

(51) Int. Cl.
*B29C 49/04* (2006.01)
*B29C 49/42* (2006.01)
(Continued)

(52) U.S. Cl.
CPC ............. *B29C 49/04* (2013.01); *B29C 49/42* (2013.01); *B29C 49/4205* (2013.01);
(Continued)

(58) Field of Classification Search
None
See application file for complete search history.

(56) References Cited

U.S. PATENT DOCUMENTS

| 4,117,061 A | 9/1978 | Jorgenso | |
|---|---|---|---|
| 6,176,699 B1 * | 1/2001 | Franjo | B29C 49/4205 264/542 |

(Continued)

FOREIGN PATENT DOCUMENTS

| CA | 993165 A | 7/1976 |
|---|---|---|
| EP | 1 334 817 A1 | 8/2003 |

(Continued)

OTHER PUBLICATIONS

Extended European Search Report by European Patent Office for corresponding EP 15 86 4497 dated Mar. 23, 2018 (9 pages)—English.

(Continued)

*Primary Examiner* — Monica A Huson
(74) *Attorney, Agent, or Firm* — Capitol City TechLaw, PLLC; Samuel P. Burkholder

(57) ABSTRACT

A hollow container producing device for producing a hollow container using a pair of parison sheets is provided. The hollow container producing device includes a pair of molds; an intermediate frame to be clamped to the pair of molds; and a transport unit that carries the intermediate frame and a pair of parison sheets to a position between the pair of molds, with the pair of parison sheets being respectively held on opposite sides of the intermediate frame.

6 Claims, 5 Drawing Sheets

(51) Int. Cl.
  *B29C 51/02* (2006.01)
  *B29C 51/10* (2006.01)
  *B29C 49/48* (2006.01)
  *B29C 51/04* (2006.01)
  *B29C 51/26* (2006.01)
  *B29C 51/30* (2006.01)
  *B29C 48/07* (2019.01)
  *B29C 47/00* (2006.01)
  *B29C 49/00* (2006.01)
  *B29C 49/20* (2006.01)
  *B29L 31/00* (2006.01)
  *B29C 47/08* (2006.01)
  *B29C 51/14* (2006.01)

(52) U.S. Cl.
  CPC .............. *B29C 49/48* (2013.01); *B29C 51/02* (2013.01); *B29C 51/04* (2013.01); *B29C 51/10* (2013.01); *B29C 51/105* (2013.01); *B29C 51/261* (2013.01); *B29C 51/30* (2013.01); *B29C 47/0019* (2013.01); *B29C 47/084* (2013.01); *B29C 48/07* (2019.02); *B29C 49/421* (2013.01); *B29C 49/4823* (2013.01); *B29C 51/14* (2013.01); *B29C 51/262* (2013.01); *B29C 51/267* (2013.01); *B29C 2049/0057* (2013.01); *B29C 2049/0068* (2013.01); *B29C 2049/2008* (2013.01); *B29C 2049/2013* (2013.01); *B29C 2049/4221* (2013.01); *B29C 2791/006* (2013.01); *B29C 2791/007* (2013.01); *B29K 2995/0067* (2013.01); *B29K 2995/0069* (2013.01); *B29L 2031/7172* (2013.01)

(56) References Cited

U.S. PATENT DOCUMENTS

| | | |
|---|---|---|
| 2003/0164572 A1 | 9/2003 | Pappert et al. |
| 2010/0282759 A1 | 11/2010 | Eckhardt et al. |
| 2012/0189727 A1 | 7/2012 | Horigome et al. |
| 2013/0228573 A1 | 9/2013 | Eckhardt et al. |
| 2013/0341825 A1 | 12/2013 | Watanabe et al. |

FOREIGN PATENT DOCUMENTS

| | | |
|---|---|---|
| JP | 48-062858 A | 9/1973 |
| JP | 6-000867 A | 1/1994 |
| JP | 2006-103116 A | 4/2006 |
| JP | 2011-194865 A | 10/2011 |
| WO | 2008154988 A1 | 12/2008 |
| WO | 2012/124618 A1 | 9/2012 |
| WO | 2013/152824 A1 | 10/2013 |

OTHER PUBLICATIONS

International Search Report by Japanese Patent Office for corresponding PCT/JP2015/079264 application dated Dec. 22, 2015 (2 pages)—English.
International Search Report by Japanese Patent Office for corresponding PCT/JP2015/079264 application dated Dec. 22, 2015 (2 pages)—Japanese.

\* cited by examiner

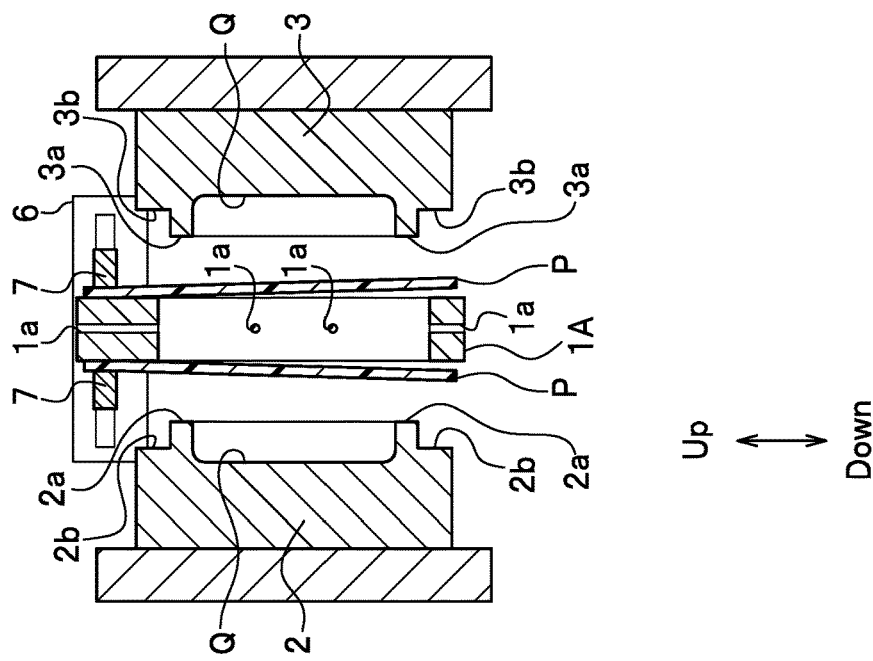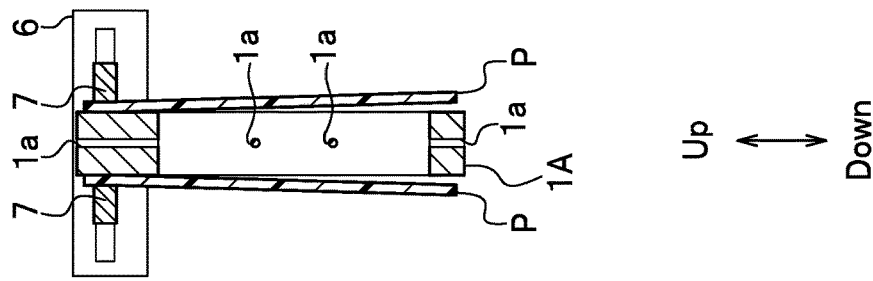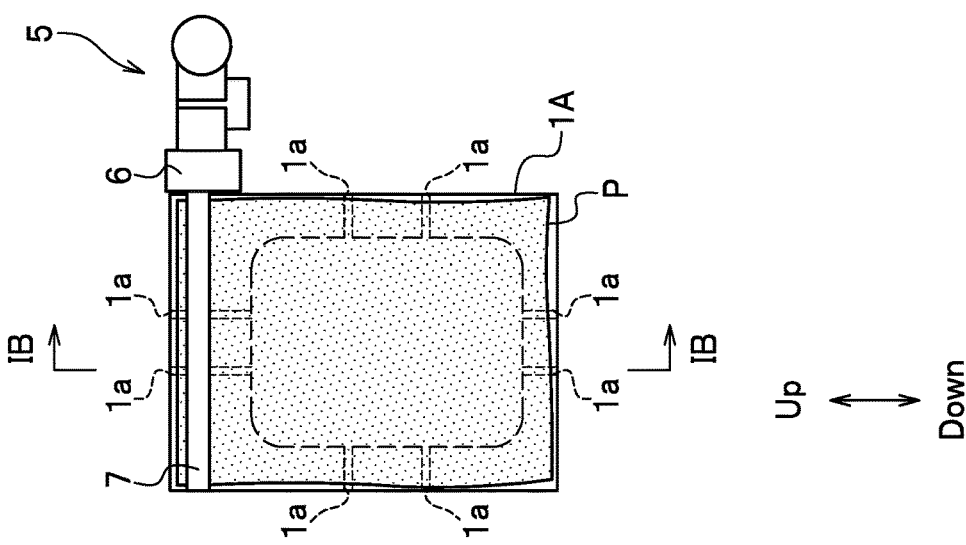

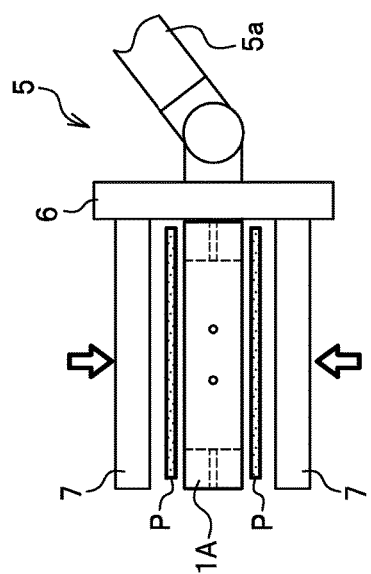
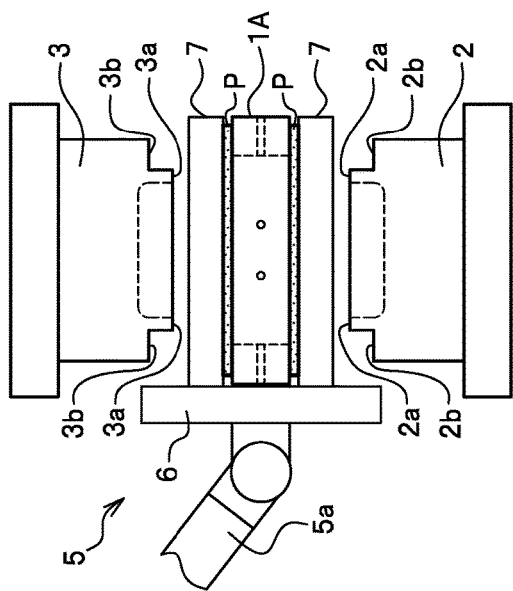
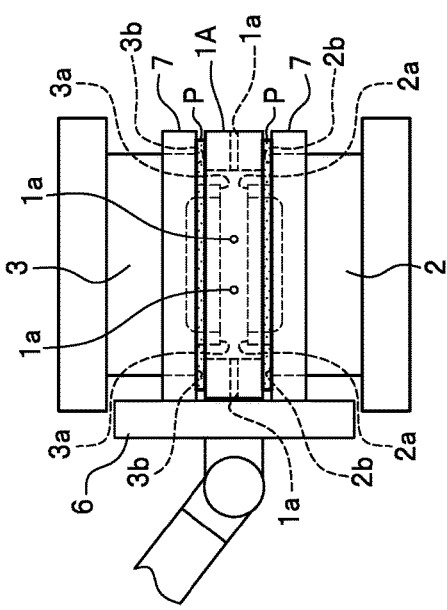
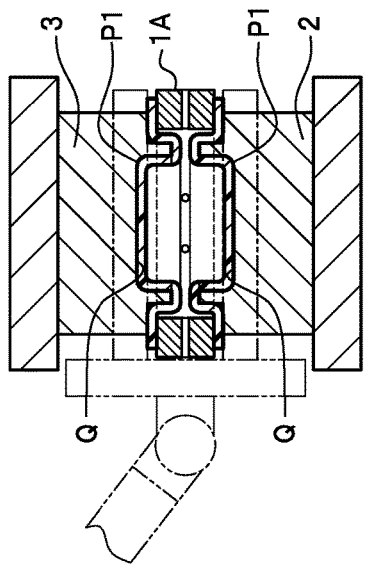

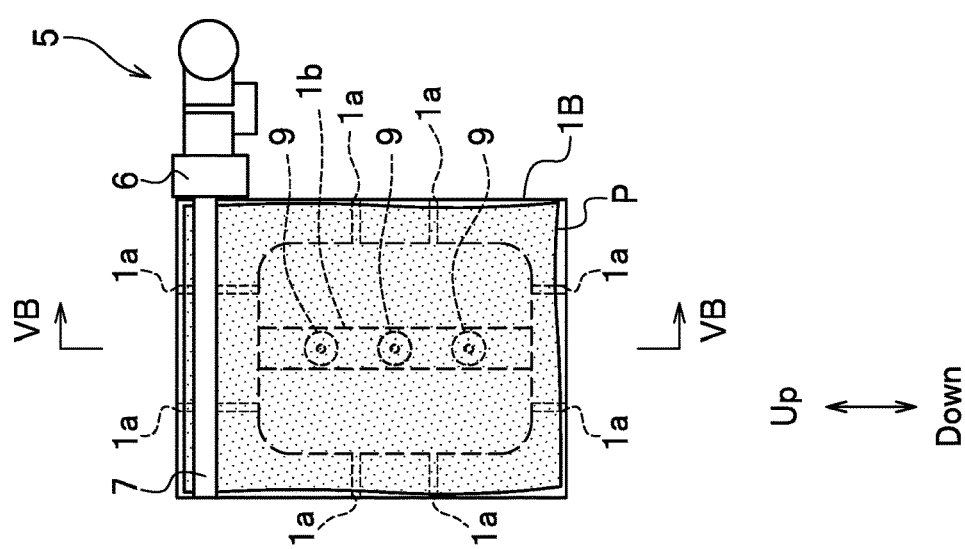
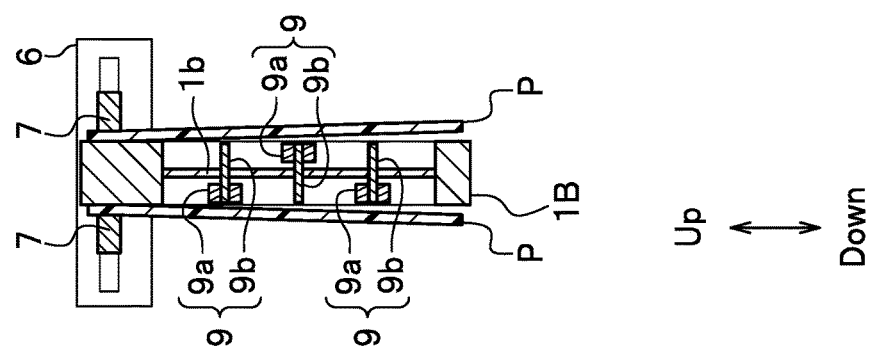
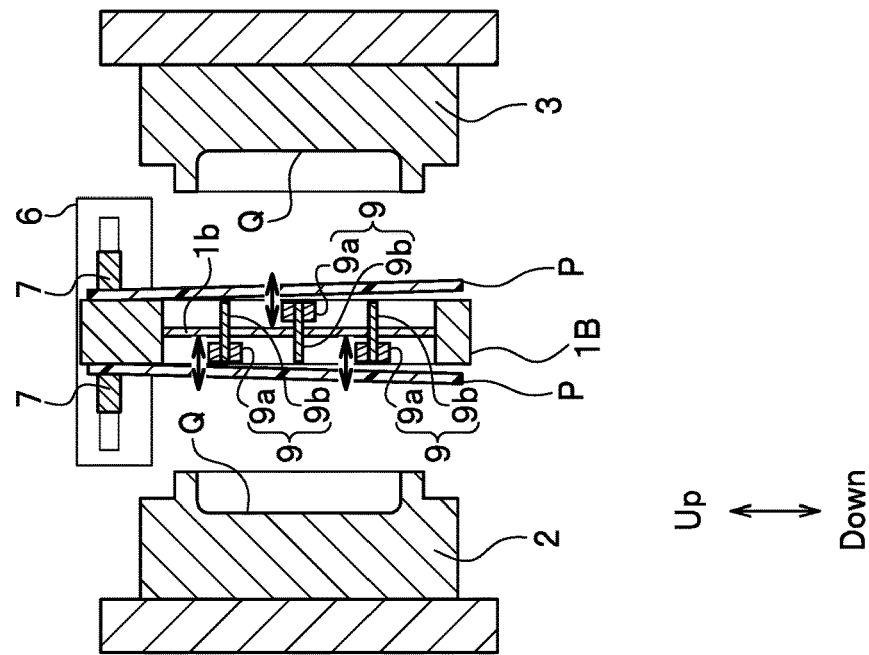

DEVICE FOR PRODUCING HOLLOW CONTAINER

CROSS-REFERENCE TO RELATED APPLICATION

This application is a U.S. National Stage Application under 35 U.S.C § 371 of International Patent Application No. PCT/JP2015/079264 filed 16 Oct. 2015, which claims the benefit of priority to Japanese Patent Application No. 2014-246500 filed 5 Dec. 2014, the disclosures of all of which are hereby incorporated by reference in their entities.

TECHNICAL FIELD

The present invention relates to a device for producing a hollow container such as a fuel tank of an automotive vehicle.

BACKGROUND ART

Japanese Patent Application Public Disclosure No. 48-062858 discloses a hollow container producing device having a convex mold, a concave mold, and a preform mold which is arranged in between the convex mold and the concave mold when molding process is carried out. The production using this hollow container producing device involves separately forming two plastic sheets (a pair of parison sheets), molding them into half shells, and then bonding the half shells to each other to thereby produce a hollow container.

RELATED ART DOCUMENT

Patent Document

Patent document 1: Japanese Patent Application Public Disclosure No. 48-062858

SUMMARY OF THE INVENTION

Problems to be Solved by the Invention

Japanese Patent Application Public Disclosure No. 48-062858 does not disclose anything about the transport mechanism for carrying the preform mold and the two plastic sheets to the convex mold and the concave mold. Taking into account that the preform mold is moved to or away from a position between the convex mold and the concave mold in each cycle of the molding process and that the two plastic sheets are carried in such a way that the two plastic sheets do not adhere to each other, it is believed that the preform mold and the two plastic sheets are separately carried. Such a transport mechanism requires a large amount of carrying time and thus causes a prolonged molding cycle.

In view of the foregoing, it is an object of the present invention to shorten the cycle of the molding process in the production of a hollow container using a pair of parison sheets.

Solution to Problem

To achieve the above-described object, the present invention provides a hollow container producing device for producing a hollow container using a pair of parison sheets. The hollow container producing device includes: a pair of molds; an intermediate frame to be clamped to the pair of molds; and a transport unit that carries the intermediate frame and a pair of parison sheets to a position between the pair of molds, with the pair of parison sheets being respectively held on opposite sides of the intermediate frame.

With this configuration of the hollow container producing device, the transport unit is capable of carrying the pair of parison sheets and the intermediate frame to a position between the pair of molds in a single carrying operation. This enables reduction of the cycle of the molding process in producing a hollow container using a pair of parison sheets. The intermediate frame is capable of holding the pair of parison sheets with the pair of parison sheets being spaced apart from each other. Thus, the pair of the parison sheets will not adhere to each other while the carrying operation by the transport unit is being carried out.

The hollow container producing device may include a jetting unit that discharges a jet of gas toward each of the pair of parison sheets from an intermediate frame side of the parison sheet.

With this configuration, blow molding by the jetting unit can be carried out to the pair of parison sheets. This improves the molding accuracy.

The intermediate frame of the hollow container producing device may include a plug projecting toward one of the molds.

This configuration provides a high degree of flexibility in designing the shape and thickness of the hollow container.

Effect of the Invention

The present invention enables reduction of the cycle of the molding process in producing a hollow container using a pair of parison sheets.

BRIEF DESCRIPTION OF THE DRAWINGS

FIG. 1A is a side view of a hollow container producing device according to a first embodiment.

FIG. 1B is a cross-sectional view taken along the line IB-IB in FIG. 1A.

FIG. 1C is a diagram illustrating the transport mechanism of a transport unit of the first embodiment.

FIGS. 3A to 3D are top views of the hollow container producing device according to the first embodiment, which respectively illustrate steps A to D of a method for producing a hollow container using the hollow container producing device.

FIG. 5A is a side view of a hollow container producing device according to a third embodiment.

FIG. 5B is a cross-sectional view taken along the line VB-VB in FIG. 5A.

FIG. 5C is a diagram illustrating plugs of the third embodiment.

EMBODIMENTS FOR CARRYING OUT THE INVENTION

First Embodiment

Figure 2:
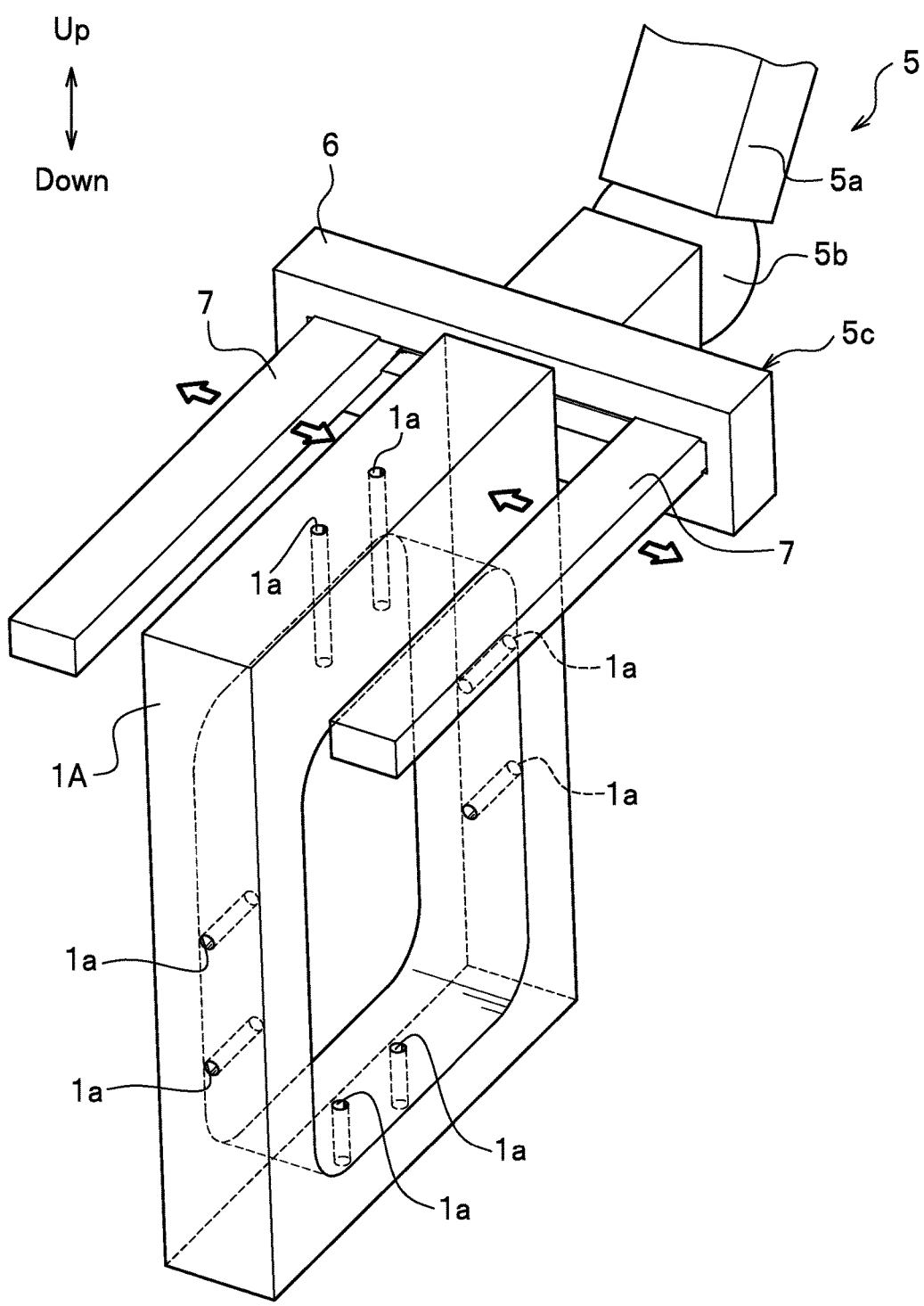
FIG. 2 is a perspective view of the transport unit of the hollow container producing device according to the first embodiment.

A first embodiment of the invention will be described referring to the accompanying drawings as appropriate.

FIGS. 1A to 1C each show a hollow container producing device of the first embodiment of the invention, which allows to produce a hollow container using a pair of parison sheets P, P, by vacuum-molding. The hollow container producing device according to the first embodiment includes a pair of molds 2, 3, an intermediate frame 1A, and a transport unit 5.

As shown in FIG. 1C, the molds 2, 3 are metal molds for forming the external shape of a hollow container by vacuum-molding. The molds 2, 3 respectively have recesses Q, Q for forming a cavity. Each of the molds 2, 3 has suction holes (not shown) for vacuum-molding, which are in communication with the recess Q of the mold.

The mold 2 has a raised portion 2a that is formed raised in a frame-like shape around the periphery of the recess Q of the mold 2. The mold 2 has a shoulder portion 2b formed outside the raised portion 2a, at a predetermined distance below the raised portion 2a. Likewise, the mold 3 has a raised portion 3a that is formed raised in a frame-like shape around the periphery of the recess Q of the mold 3. The mold 3 has a shoulder portion 3b formed outside the raised portion 3a, at a predetermined distance below the raised portion 3a.

As shown in FIGS. 1A to 1C and 2, the intermediate frame 1A is a center mold to be placed and clamped between the molds 2, 3. The intermediate frame 1A has a rectangular frame shape. The intermediate frame 1A has a through-opening located in the center thereof that extends through in the thickness direction of the frame 1A. The intermediate frame 1A has vents 1a which are in communication with the through opening and through which the outside air is taken in while suction for vacuum-molding is being applied. The intermediate frame 1A of the first embodiment has sides each of which is provided with two vents 1a. However, the number of the vents 1a is not limited to this.

As illustrated in FIGS. 1A to 1C, the transport unit 5 is a device for carrying the intermediate frame 1A and the parison sheets P, P to a position between the molds 2, 3 (see FIG. 2), in a manner later described. The transport unit 5 has an arm 5a, a coupling 5b, and a hand 5c.

The arm 5a is rod-shaped and moves in a predetermined space to carry the intermediate frame 1A and the parison sheets P, P. The coupling 5b couples the arm 5a and the hand 5c together and is capable of changing the coupling angle therebetween. The hand 5c constitutes a front end part of the transport unit 5 and holds the intermediate frame 1A and the parison sheets P, P. The hand 5c has a slider 6 and a pair of chucks 7, 7.

The slider 6 is a device that causes the chucks 7, 7 to slide close to or apart from each other. To a widthwise center portion of the slider 6, an upper portion of the intermediate frame 1A is fixed. The slider 6 is provided with an actuator (not shown) that actuates the chucks 7, 7. The chucks 7, 7 are a pair of rod-like members that are slid by the slider 6. The chucks 7, 7 are capable of holding the parison sheets P, P on the intermediate frame 1A by sandwiching an upper portion of the intermediate frame 1A and upper portions of the pair of parison sheets P, P between the chucks 7, 7.

The parison sheets P, P are each for example formed of a thermoplastic resin including a barrier layer. Each of the parison sheets P, P has a multi-layer structure including an EVOH layer (ethylene-vinyl alcohol copolymer layer), which is located in the middle of the multi-layer structure as a barrier layer that blocks fuel transmission. The multi-layer structure includes a PE layer (polyethylene layer), adhesive layers, and other layers as well.

As shown in FIGS. 1A to 1C, the parison sheets P, P are each in a rectangular sheet shape. Such parison sheets P, P can be obtained for example by: preparing a specialized die head (not shown) by disposing two branching members facing each other in an outlet of a general die head, through which cylindrical parison is to be extruded, to branch a cylindrical parison flow; and extruding parison from the specialized die head so as to convert the parison to sheets. The parison sheets P, P each formed in a rectangular shape are guided to the opposite sides of the intermediate frame 1A from above, between the chucks 7, 7.

As shown in FIG. 1C, the transport unit 5 carries the intermediate frame 1A and the pair of parison sheets P, P sandwiched by the chucks 7, 7 to a position between the molds 2, 3. The molds 2, 3 are closed against the carried intermediate frame 1A and parison sheets P, P, and then clamped together.

When the molds 2, 3 are clamped together, the shoulder portions 2b, 3b of the molds 2, 3 make contacts with the opposite sides of the intermediate frame 1A. Here, the raised portion 2a of the mold 2 and the raised portion 3a of the mold 3 are not in contact with each other and accepted in the through-opening of the intermediate frame 1A. This means that the raised portions 2a and 3a are formed in a smaller size than the intermediate frame 1A.

<Method for Producing Hollow Container>

Next, description will be given of a method for producing a hollow container using the hollow container producing device according to the first embodiment.

First, as shown in FIG. 3A, rectangular-shaped parison sheets P, P, which have been drawn down and cut into two pieces, are moved down toward the transport unit 5 of the hollow container producing device arranged at a predetermined place. Note that the direction in which the parison sheets P, P are moved down is a direction from the front surface to the back surface of the drawing plane of FIG. 3. The pair of parison sheets P, P are guided to respective positions between the chucks 7, 7 opened outward and the intermediate frame 1A. After that, the chucks 7, 7 of the transport unit 5 slide inward to sandwich an upper portion of the intermediate frame 1A and upper portions of the parison sheets P, P between the chucks 7, 7. As a result, the parison sheets P, P are held on opposite sides of the intermediate frame 1A.

Subsequently, as shown in FIG. 3B, the arm 5a is moved so as to carry the parison sheets P, P and the intermediate frame 1A to a position between the molds 2, 3, with the pair or parison sheets P, P being held on the opposite sides of the intermediate frame 1A by the chucks 7, 7.

Subsequently, as shown in FIG. 3C, the molds 2, 3 are closed against the carried intermediate frame 1A and parison sheets P, P, and then clamped together. Peripheral portions of the parison sheets P, P are pinched off by the shoulder portions 2b, 3b of the molds 2, 3 and side surfaces of the intermediate frame 1A.

Subsequently, as shown in FIG. 3D, vacuum suction is carried out through the suction holes (not shown) of the molds 2, 3, so that the pair of parison sheets P, P are transferred to the recesses (molding surfaces) Q, Q of the molds 2, 3. Portions of the pair of parison sheets P, P transferred to the molding surface of the molds 2, 3 are referred to as half shells P1, P1.

Figure 4E:
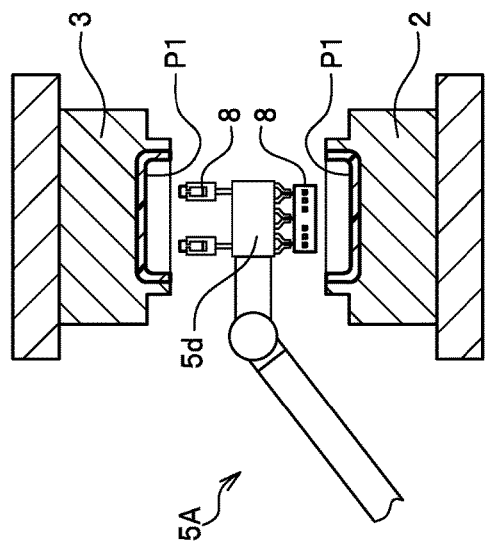
FIGS. 4E to 4H are top views of the hollow container producing device according to the first embodiment, which respectively illustrate steps E to H of the method for producing a hollow container using the hollow container producing device.

Subsequently, as shown in FIG. 4E, the molds 2, 3 are opened and the chucks 7, 7 of the transport unit 5 are slid outwardly. To be accurate, the chucks 7, 7 of the transport unit 5 are slid outwardly and then the molds 2, 3 are opened. Burr portions of the parison sheets P, P other than the half shells P1, P1 are cut away from the intermediate frame 1A. Alternatively, the burr portions may be left as is at this stage and then cut out in a later stage after the half shells P1, P1 are joined to each other as described later. The transport unit 5 moves away to a predetermined place together with the intermediate frame 1A, which has been released from the molds 2, 3 having been opened.

Figure 4F:
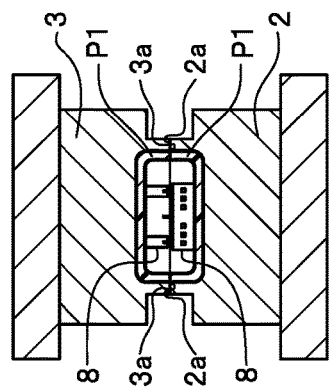

Subsequently, as shown in FIG. 4F, a transport unit 5A carries built-in parts 8 held by a hand 5d to a position between the half shells P1, P1. In the present embodiment, the transport unit 5 and the transport unit 5A are separate units. Alternatively, the hand 5c, which is attached to arm 5a of the transport unit 5, may be configured to be replaceable with the hand 5d so that the transport unit 5 and the transport unit 5A share most of their parts in common. Examples of the built-in parts 8 include valves and wave-eliminating plates, which are attached to an inner wall of the hollow container. Actuators (not shown) mounted in the hand 5d are operated so as to force the built-in parts 8 into the half shells P1, P1 and attach the built-in parts 8 thereto. Alternatively, the hand 5d itself may be moved so as to force the built-in parts 8 into the half shells P1, P1 and attach the built-in parts 8 thereto.

Figure 4G:
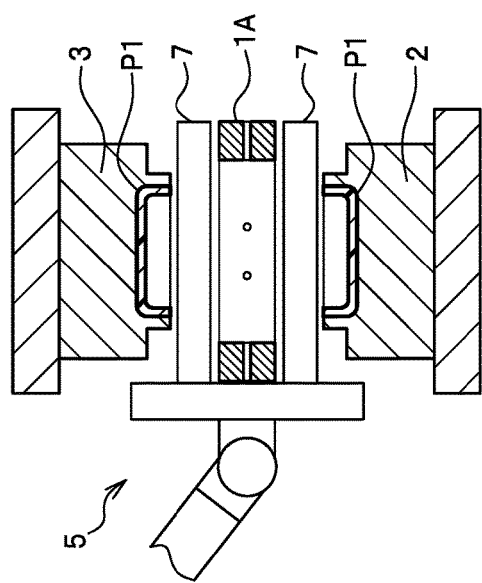

Subsequently, as shown in FIG. 4G, after the operation of attaching the built-in parts 8 is finished, the transport unit 5A is moved away to a predetermined place.

Figure 4H:
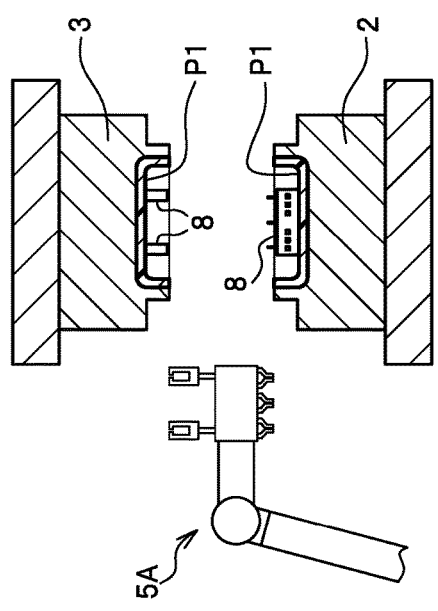

Subsequently, as shown in FIG. 4H, the molds 2, 3 are closed and clamped together again. In this step, end surfaces of the half shells P1, P1 are joined with each other, and thereby a hollow container is completed. In this step, in which the end surfaces of the half shells P1, P1 are joined with each other, air blowing may be carried out by a blow pin (not shown) to blow air into the inner space of the hollow container, thereby transferring the half shells P1, P1 to the molds 2, 3 for a second time. This ensures positive transfer of the half shells P1, P1 and enables reduction of the cycle of the molding process by cooling the half shells P1, P1.

According to the first embodiment, the transport unit 5 is capable of carrying the pair of parison sheets P, P and the intermediate frame 1A to a position between the pair of molds 2, 3 in a single carrying operation. This enables reduction of the cycle of the molding process in producing a hollow container using a pair of parison sheets P, P. The intermediate frame 1A is capable of holding the pair of parison sheets P, P with the pair of parison sheets P, P being spaced apart from each other. Thus, the pair of the parison sheets P, P will not adhere to each other while the carrying operation by the transport unit 5 is being carried out.

Second Embodiment

Next, description will be given of a second embodiment focusing on the differences thereof from the first embodiment. A hollow container producing device according to the second embodiment further includes a jetting unit that discharges a jet of gas toward each of the pair of parison sheets P, P from an intermediate frame 1A side of the parison sheet.

Referring to FIG. 2, the jetting unit is constituted by vents 1a and air supply means (not shown) such as an air compressor. A jet of air supplied by the air supply means through the vents 1a is discharged toward the parison sheets P, P via the through-opening of the intermediate frame 1A. Vacuum suction is carried out to the parison sheets through the molds 2, 3, and, at the same time, a jet of air is discharged toward each of the pair of parison sheets P, P from an intermediate frame 1A side of the parison sheet. This enables more positive transfer of the parison sheets P, P to the molds 2, 3. The use of the jetting unit is particularly preferable when the shape of the hollow container is complex. Incidentally, the air supply means may be arranged in the through opening of the intermediate frame 1A.

Third Embodiment

Next, description will be given of a third embodiment focusing on the differences thereof from the first embodiment. As shown in FIGS. 5A to 5C, a hollow container producing device according to the third embodiment includes an intermediate frame 1B in place of the intermediate frame 1A. The intermediate frame 1B has a through opening in which a plurality of plugs 9 and a board 1b are disposed.

The plugs 9 serve to cause some portions of the parison sheets P, P to have different shapes and/or thicknesses from other portions of the parison sheets P, P. In the third embodiment, three plugs 9 are provided. However, the number of the plugs 9 is not limited thereto. The board 1b is a plate-like member holding the plugs 9. As shown in FIG. 5A, the board 1b extends from a top end of the intermediate frame 1B to a bottom end thereof.

As shown in FIGS. 5B and 5C, each of the plugs 9 has a head 9a and a shaft 9b. The head 9a is attached to an end of the shaft 9b. The shaft 9b extends through the board 1b in a thickness direction thereof, i.e., the thickness direction of the intermediate frame 1B. The hollow container producing device according to the third embodiment has an actuator (not shown) that causes the plugs 9 to move forward or backward relative to the board 1b in an axial direction of the shafts 9b.

As shown in FIGS. 5B and 5C, while the intermediate frame 1B and the parison sheets P, P are being carried to a position between the molds 2, 3, the plugs 9 are within the through-opening of the intermediate frame 1B and are not in contact with the parison sheets P, P, which are held by the chucks 7, 7. Immediately before the molds 2, 3 being clamped, the plugs 9 move to the parison sheets P, P and make contacts therewith, so that the parison sheets P, P are partially cooled down. This enables configuring desired portions of the parison sheets P, P to have desired shapes and thicknesses.

It is to be noted that, in FIG. 5C, the recesses Q, Q of the molds 2, 3 are drawn as each having a bottom portion with a flat surface. However, the bottom portion may have ridges and dents in accordance with the desired shape of the hollow container as appropriate. According to the third embodiment, the use of the plugs 9 provides a high degree of flexibility in designing the shape and thickness of the hollow container.

<Others>

Embodiments according to the present invention have been described above. However, the present invention is not limited thereto, and modifications and changes can be made as appropriate without departing from the spirit of the present invention. For example, in the first embodiment, the parison sheets P, P have been described as being carried with upper portions thereof being sandwiched to the upper portions of the intermediate frame 1A by the chucks 7, 7. However, the parison sheets P, P may be carried with lower portions thereof also being sandwiched to lower portions of the intermediate frame 1A. Further, the parison sheets P, P may be carried with any portions thereof being sandwiched on the opposite sides of the intermediate frame 1A.

Moreover, in the first embodiment, the transport unit 5A that carries built-in parts 8 and the transport unit 5 that carries the intermediate frame 1A are described as separate devices (FIG. 4F). However, those devices may be configured as the same device. With this configuration, one single transport unit serves to carry the intermediate frame 1A and to carry the built-in parts 8. This facilitates downsizing the workspace for producing hollow containers.

Further, the blow molding using the jetting unit in the second embodiment may be carried out in place of or in combination with the above-described vacuum-molding.

Further, in the third embodiment, the location, dimensions, and shape of the board 1b, which is disposed in the through-opening of the intermediate frame 1B, can be set appropriately. In addition, the locations and dimensions of the plugs 9 fixed to the board 1b can also be set appropriately. Further, in the third embodiment, the plugs 9 are described as each having a cylindrical shape. However, the plug 9 can have another shape such as a hemispherical shape, taper-shape, or tubular-shape.

Moreover, constituent members of the hand 5c of the transport unit 5 or constituent members of the hand 5d of the transport unit 5A may be configured to be replaceable to facilitate switching between different molding methods, such as the above-described vacuum-molding, general blow molding for forming a hollow container from a cylindrical parison, and simultaneous molding and filling by which a hollow container is formed by molding a cylindrical parison with a wave-eliminating plate or the like being housed therein.

Other than as described above, the shape, material, function of a component of the present invention can be altered appropriately without departing from the spirit of the present invention.

LIST OF REFERENCE SIGNS

| | |
|---|---|
| 1A, 1B | intermediate frame |
| 1a | vent |
| 1b | board |
| P | parison sheet |
| P1 | half shell |
| Q | recess |
| 2, 3 | mold |
| 2a, 3a | raised portion |
| 2b, 3b | shoulder portion |
| 5, 5A | transport unit |
| 5a | arm |
| 5b | coupling |
| 5c, 5d | hand |
| 6 | slider |
| 7 | chuck |
| 8 | built-in part |
| 9 | plug |
| 9a | head |
| 9b | shaft |

The invention claimed is:

1. A hollow container producing device for producing a hollow container using a pair of parison sheets, comprising:
a pair of molds;
an intermediate frame having a pair of opposite side surfaces,
wherein the intermediate frame is to be clamped to the pair of molds; and
a transport unit comprising a pair of chucks,
wherein the pair of chucks is configured to hold a pair of parison sheets respectively on the pair of opposite side surfaces of the intermediate frame by sandwiching each of the pair of parison sheets between corresponding one of the pair of chucks and corresponding one of the pair of opposite side surfaces of the intermediate frame, and
wherein the transport unit is configured to, while holding the pair of parison sheets respectively on the pair of opposite side surfaces of the intermediate frame by using the pair of chucks, carry the intermediate frame and the pair of parison sheets together to a position between the pair of molds.

2. The hollow container producing device according to claim 1, further comprising a jetting unit that discharges a jet of gas toward each of the pair of parison sheets from an intermediate frame side of the parison sheet.

3. The hollow container producing device according to claim 1,
wherein the intermediate frame comprises a plug projecting toward one of the pair of molds.

4. The hollow container producing device according to claim 2,
wherein the intermediate frame comprises a plug projecting toward one of the pair of molds.

5. A hollow container producing device for producing a hollow container using a pair of parison sheets, comprising:
a pair of molds;
an intermediate frame to be clamped to the pair of molds; and
a transport unit that carries the intermediate frame and a pair of parison sheets to a position between the pair of molds, with the pair of parison sheets being respectively held on opposite sides of the intermediate frame,
wherein the intermediate frame comprises a plug projecting toward one of the pair of molds.

6. A hollow container producing device for producing a hollow container using a pair of parison sheets, comprising:
a pair of molds;
an intermediate frame to be clamped to the pair of molds;
a jetting unit that discharges a jet of gas toward each of a pair of parison sheets from an intermediate frame side of the parison sheet, and
a transport unit that carries the intermediate frame and the pair of parison sheets to a position between the pair of molds, with the pair of parison sheets being respectively held on opposite sides of the intermediate frame,
wherein the intermediate frame comprises a plug projecting toward one of the pair of molds.

* * * * *